(12) United States Patent
O'Neill

(10) Patent No.: US 6,490,748 B1
(45) Date of Patent: Dec. 10, 2002

(54) FLEXIBLE DRILL ROD

(75) Inventor: Brendan Edmond O'Neill, Geelong East (AU)

(73) Assignee: Kemtech International Pty, Ltd., Victoria (AU)

( * ) Notice: Subject to any disclaimer, the term of this patent is extended or adjusted under 35 U.S.C. 154(b) by 125 days.

(21) Appl. No.: 09/592,279

(22) Filed: Jun. 12, 2000

(51) Int. Cl.[7] .............................. B08B 9/02; B08B 9/045
(52) U.S. Cl. .............................. 15/104.09; 15/104.05; 15/104.095; 15/104.16
(58) Field of Search .................... 15/104.05, 104.09, 15/104.095, 104.12, 104.16, 104.31; 166/170

(56) References Cited

U.S. PATENT DOCUMENTS

| | | | | |
|---|---|---|---|---|
| 949,637 A | * | 2/1910 | Stormer | |
| 1,424,109 A | * | 7/1922 | McBride | |
| 2,090,174 A | * | 8/1937 | Albright | |
| 2,332,940 A | * | 10/1943 | Senke | |
| 4,292,704 A | * | 10/1981 | Joanis, Sr. | |
| 4,705,107 A | * | 11/1987 | Council | |
| 5,745,948 A | * | 5/1998 | Lloyd | |
| 5,755,002 A | * | 5/1998 | Lacy | |
| 5,813,089 A | * | 9/1998 | Nolan | |
| 5,819,354 A | * | 10/1998 | Alonso | |
| 5,953,782 A | * | 9/1999 | Vogel | |
| 6,276,018 B1 | * | 8/2001 | Leiman | |

FOREIGN PATENT DOCUMENTS

| | | | |
|---|---|---|---|
| CA | 1001810 | * | 12/1976 |
| SU | 1335384 | * | 9/1987 |

* cited by examiner

Primary Examiner—Randall E. Chin
(74) Attorney, Agent, or Firm—Sughrue Mion, PLLC

(57) ABSTRACT

A drill rod for clearing obstructing material from the interior of a tapping pipe used for evacuation of aluminium from a reduction cell of an aluminium smelter by drilling, wherein the drill rod is flexible, whereby it may drill obstructing material from said tapping pipe, through a bend in the tapping pipe.

6 Claims, 13 Drawing Sheets

FLEXIBLE DRILL ROD

BACKGROUND OF THE INVENTION

1. Field of the Invention

The invention relates to the cleaning of tapping pipes used in reduction cells of aluminium smelters.

2. Prior Art

Molten aluminium is tapped from reduction cells in the aluminium smelting industry using vacuum-assisted tapping pipes (also known as tapping siphons or tapping tubes) into either sealed or open crucibles (or ladles). Older-generation tapping pipes, for use with either sealed open crucibles, are usually curved (or otherwise bent) in profile whereas more recent technologies, over the last twenty years or so, normally utilise straight tapping pipes with sealed crucibles.

Within the reduction cell (also known as a smelting pot) the molten aluminium is below the molten electrolyte known as bath (which is principally comprised of cryolite). In tapping the aluminium, there is inevitably some pick-up of bath and after several uses a build-up of frozen bath, and some aluminium, is left within the tapping pipes. This renders the tapping pipes ineffective and requires that they be regularly cleaned.

Curved tapping pipes have in the past been cleaned using a mechanism known as a pneumatic rattler. This is in the form of a small pneumatic motor with a swiveling head attached to a pneumatic hose, which is fed trough the pipe manually. This is an extremely noisy and dusty operation which is considered unacceptable in today's smelters.

Straight tapping pipes are usually cleaned by automatic tapping pipe cleaning machines which utilise a long straight drill rod with some form of cutter head, rotated by an electric or hydraulic drive, and which is fed forward by an electric, pneumatic or hydraulic mechanism. Some designs of these machines have a longitudinal hole in the centre of the drill rod to allow compressed air to be channelled to the cutter head. This air serves the dual functions of purging debris away from the workface and cooling the cutter head.

Problems with automated cleaning of curved pipes have been the requirement to transmit sufficient torque to a cutter head to remove the bath/metal build-up and to be able to channel air to the cutter head.

SUMMARY OF THE INVENTION

According to the present invention, there is provided a drill rod for clearing obstructing material from the interior of a tapping pipe used for evacuation of aluminium from a reduction cell of an aluminium smelter by drilling, wherein the drill rod is flexible, whereby it may drill obstructing material from said tapping pipe, through a bend in the tapping pipe.

The invention further provides apparatus for drilling obstructing material from within a tapping pipe of a reduction cell of an aluminium smelter, having:

a) means for mounting the pipe substantially fixedly;
b) a drilling rod having a cutting head;
c) means for rotating the drilling rod for rotating said cutting rod;
d) means for axially advancing the drilling rod to cause the cutting head and drilling rod to pass into the interior of the tapping pipe for effecting said drilling, wherein said drilling rod is, over at least a portion thereof adjacent to the cutting head, capable of bending whereby it may, while effecting said cutting, pass through a bend in the tapping pipe.

The invention also provides a method for removing material from a tapping pipe comprising passing thereinto a rotating drilling rod having a cutting head whereby to cause the cutting head to clear said obstructing material by drilling, and in which the drilling rod is at least partially bendable, while transmitting cutting torque to the cutting head to accommodate a bend in the pipe.

The invention also provides rotary device having links coupled together for rotation about a lengthwise device axis, coupling between an adjacent pair of said links being provided by coupling means which couples the adjacent links together for permitting substantially universal movement with respect to each other transversely to said device axis, the coupling means permitting relative displacement between the adjacent links whereby the axial length presented by the adjacent links can be varied between relatively compressed and relatively uncompressed lengths, the coupling means, when the adjacent links are displaced to the condition where the relatively compressed length prevails, at least relatively limiting the degree of said substantially universal movement permitted as between the adjacent links.

DESCRIPTION OF THE DRAWINGS

The invention is further described, by way of example only, with reference to the accompanying drawings, in which.

DETAILED DESCRIPTION

Figure 1:
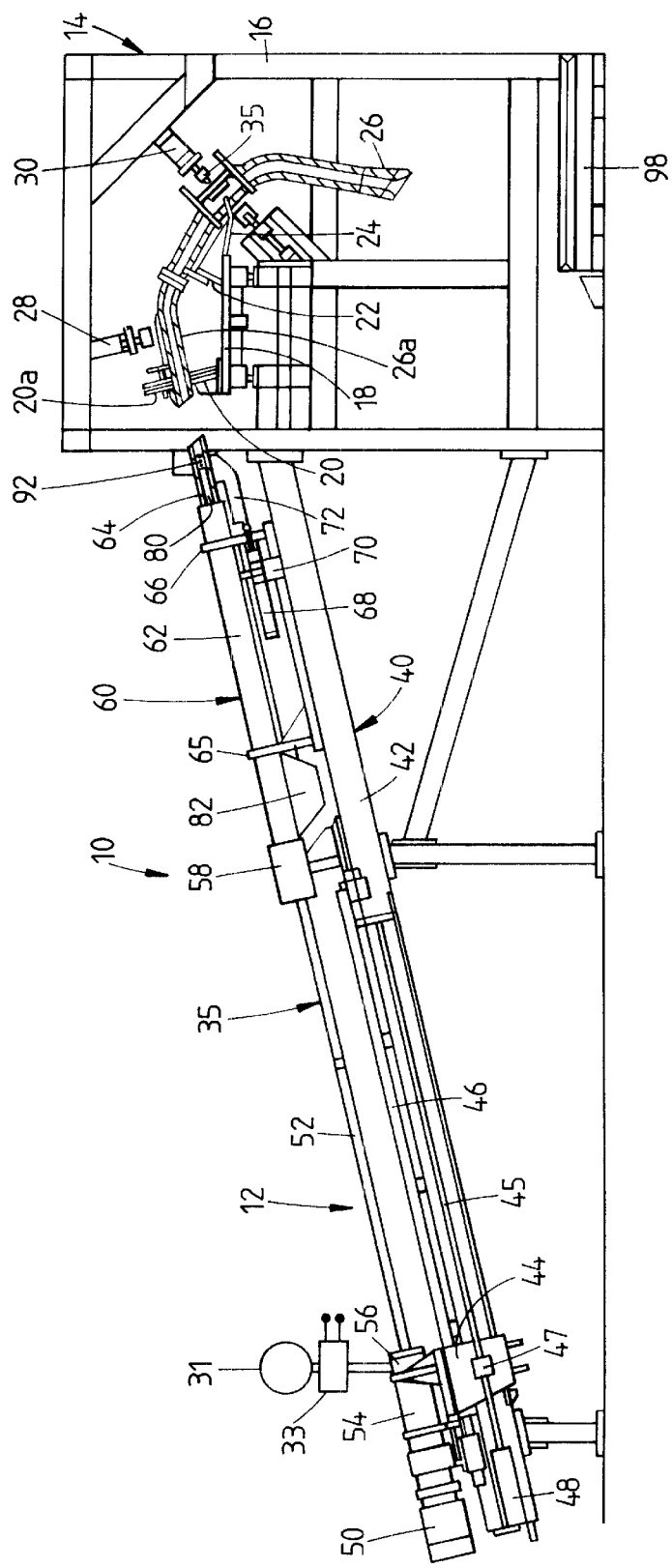
FIG. 1 is a side view of an apparatus constructed in accordance with the invention.

The apparatus 10 shown in FIG. 1 is formed of two sub-assemblies, a drill rig assembly 12 and a tapping pipe cradle assembly 14. Assembly 14 comprises a framework 16 which supports a platform 18 at a location somewhat above ground level. Platform 18 has support elements 20, 22, 24 for supporting the tapping pipe 26 which is to be cleaned. As shown, the tapping pipe 26 is of curved configuration and, for cleaning, it is supported from beneath by two of the elements, elements 22 and 24, which may, for example, be in the form of "V" blocks, with the element 20 being upwardly extending from the platform 18 but having a downwardly depending and upwardly open hooked upper end 20a which hooks over a forward end of the pipe 26. After positioning in this fashion, hydraulic rams 28, 30, 35 mounted on the frame 16 are actuated to press against the pipe 26 at spaced locations therealong so that the pipe 26 is securely pressed against the elements 22, and a lower portion (not shown) of the element 20.

The positioning of the pipe 26 on the cradle assembly 14 may be effected manually by lifting and placing it in position as described or, alternatively, mechanical arrangements able, for example, to position ones of a number of pipes in succession for cleaning may be used. Although the pipe 26 is shown as a detached unit, in some constructions, the pipe 26 is attached permanently to a lid of a crucible which is used for evacuation of aluminium from the reduction cell. In such cases, the framework 16 may be modified to additionally support the lid.

The drill rig subassembly 12 comprises a framework 40, including an elongate sloping bed 42 which extends linearly from a lower location, spaced away from the cradle assembly 14 to a relatively higher location at which it joins to the frame 16 of the cradle assembly 14.

A carriage 44 is mounted for sliding movement lengthwise with respect to the bed 42, particularly being slidable along lengthwise extending guide bars 46, carried by the bed 42 and which extend through sliding bearings on the carriage 44. In FIG. 1, the carriage 44 is shown at a lower position, that is at a location which is furthest away from the cradle assembly 14. It may, however, be moved up the inclined bed 42, on bars 46, to an upper position, at which the carriage 44 is about half-way along the length of the bed 42.

A drive motor 48 is provided on the bed 42, which rotationally drives a helically grooved drive shaft 45 of a ball screw assembly for effecting movement of the carriage 44 to and between these positions by engagement with a ball screw nut 47 fixed to the carriage 44 and through which the drive shaft 45 passes.

Figure 2:
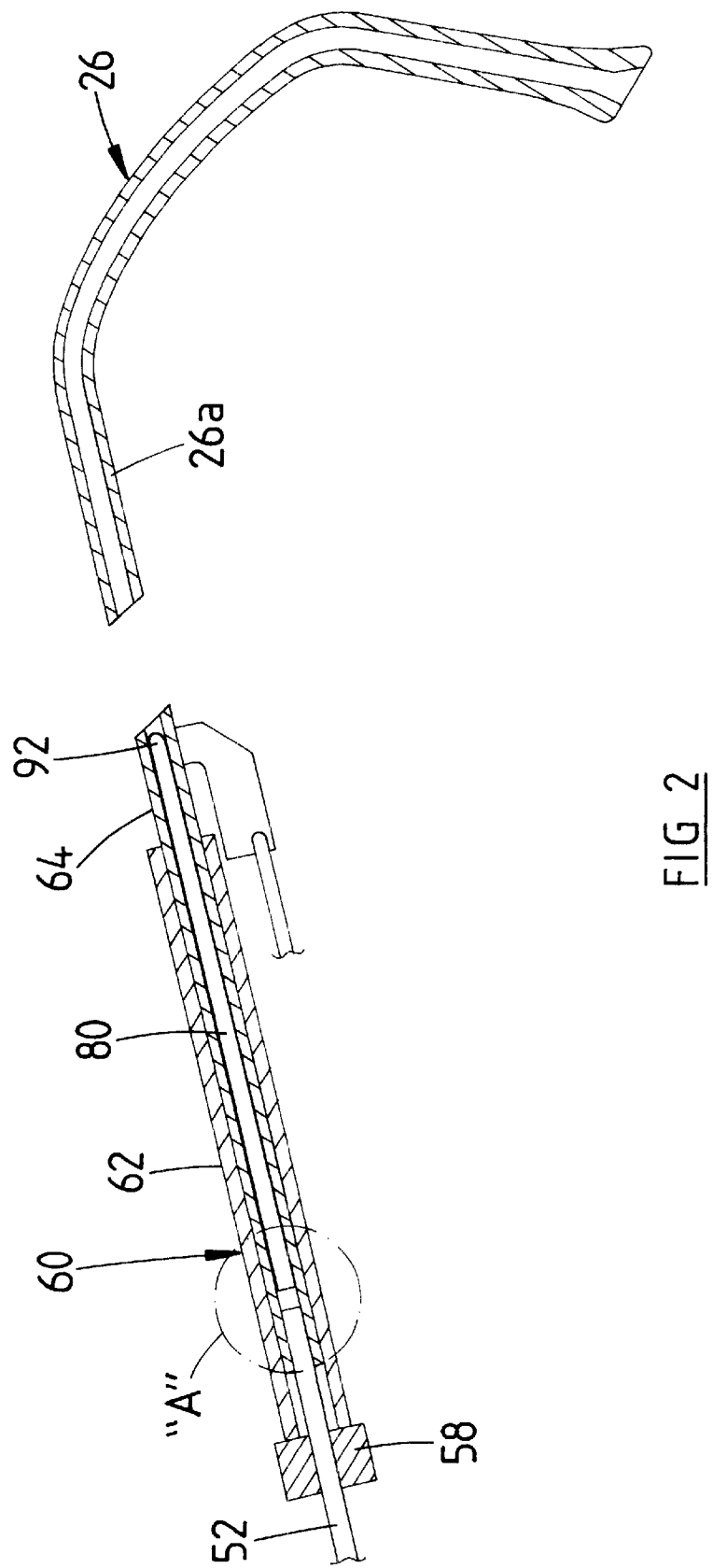
FIG. 2 is a partially vertically sectioned view of guide tube assembly and flexible drill rod forming parts of the apparatus of FIG. 1, and an aligned tapping pipe.

The carriage 44 carries a drive motor 50 which may, for example; comprise a hydraulic or electric motor arranged for driving an elongate shaft 52 via a reduction gear assembly 54. Shaft 52 is mounted by a bearing 56 such that it can rotate axially about an axis extending in the lengthwise direction of the bed 42, and somewhat above the bed, while being axially immoveable with respect to the carriage 44. From the bearing 56, shaft 52 extends through a bearing assembly 58 mounted on the bed 42 and thence into a guide assembly 60. As shown in FIG. 2, the guide assembly 60 comprises an outer tube 62 and an inner guide tube 64. The guide assembly 60 is fixed with respect to the bed 42, being carried by brackets 65, 66. As described later to tube 64 is mounted for axial sliding movement within the tube 62, from the position shown in FIG. 1 to axially move forward positions. This movement is effected by actuation of a ram 68 fixed to bed 42 by a bracket 70, and having its piston rod connected to a downwardly depending bracket 72 fixed to the guide tube 64.

The forward end of the shaft 52 is secured to a forwardly and upwardly extending flexible drill rod 80 which extends into guide tube 64 of guide assembly 60. In the position of the carriage 44 as shown in FIG. 1, and with the guide tube 64 retracted, the forward end of the flexible drill rod 80 is positioned approximately just within the free outer end of the guide tube 64 which, in this condition, projects somewhat from the guide tube 62. This condition is illustrated in FIG. 2.

The forward end of the flexible drill rod 80 carries an affixed cutting head 92. The shaft 52, drill rod 80 and head 92 together form a drilling assembly 35, which is rotatable as a unit by motor 50, and which can be moved back and forth with respect to bed 42 by movement of carriage 44 when motor 48 is operated.

Shaft 52 and flexible drill rod 80 are hollow, and head 92 has side openings. Air under pressure derived from a source 31 can, in use of the apparatus, be passed into a hollow conduit extending through the shaft 52, via a rotary coupling incorporated into the bearing 56 to flow into the hollow drill rod 80 and the interior of the head 92, to exit from the head 92 via the mentioned openings. Flow is controlled by a purge valve solenoid 33.

The pipe 26 has a portion 26a adjacent to the assembly 12 and which is somewhat linear and extends, when the pipe 26 is clamped into position as shown, in axial alignment with the guide assembly 60, including the outer tube 62 and guide tube 64 as well as the flexible drill rod 80.

Cleaning operation begins, by operating motor 50 to cause the shaft 52 and flexible drill rod 80 to be axially rotated, with carriage 44 in the position shown in FIG. 1. Then the hydraulic ram 68 is extended causing the guide tube 64 to be advanced so that its end engages the end of portion 26a of the pipe 26, and in this case that the internal passageway of the pipe 26 is more-or-less exactly aligned with the internal passageway of the guide tube 64. This position of the guide tube 64 is illustrated in FIG. 3.

Following engagement of the guide tube 64 with the pipe 26, motor 48 is actuated to cause the carriage 44 to advance upwards along the bed 42 to cause the forward end of the flexible drill rod 80, which carries a cutting head 92, to enter into the internal passageway of the pipe 26 and to drill from this accumulated material such as bath or the like within the pipe 26.

As drilling begins, air from source 31 as passed through the shaft 52, drill rod 80 and head 92, exits from the drill head to facilitate drilling and cleaning of drilled material.

Figure 3:
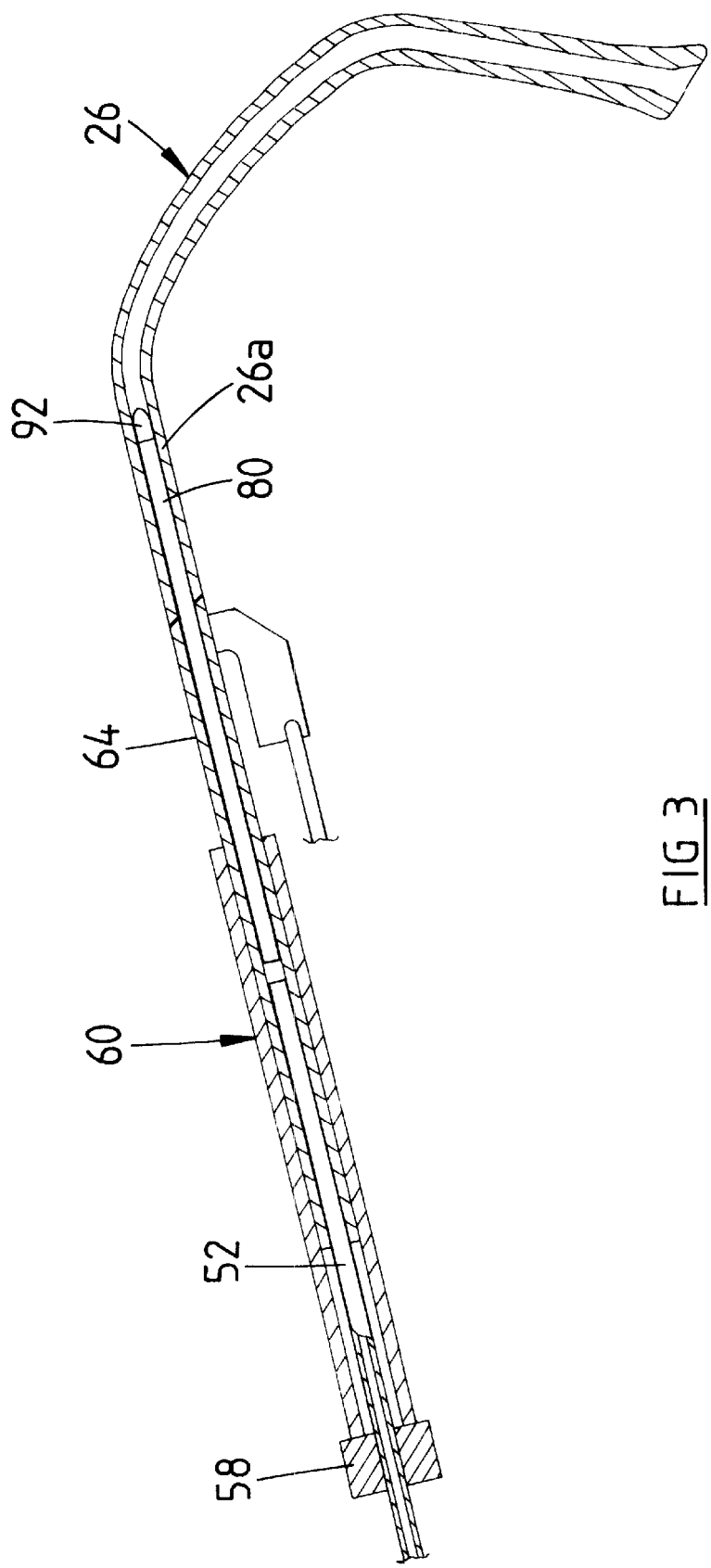
FIG. 3 is a view like FIG. 2 but showing illustrated components in a different condition.
Figure 4:
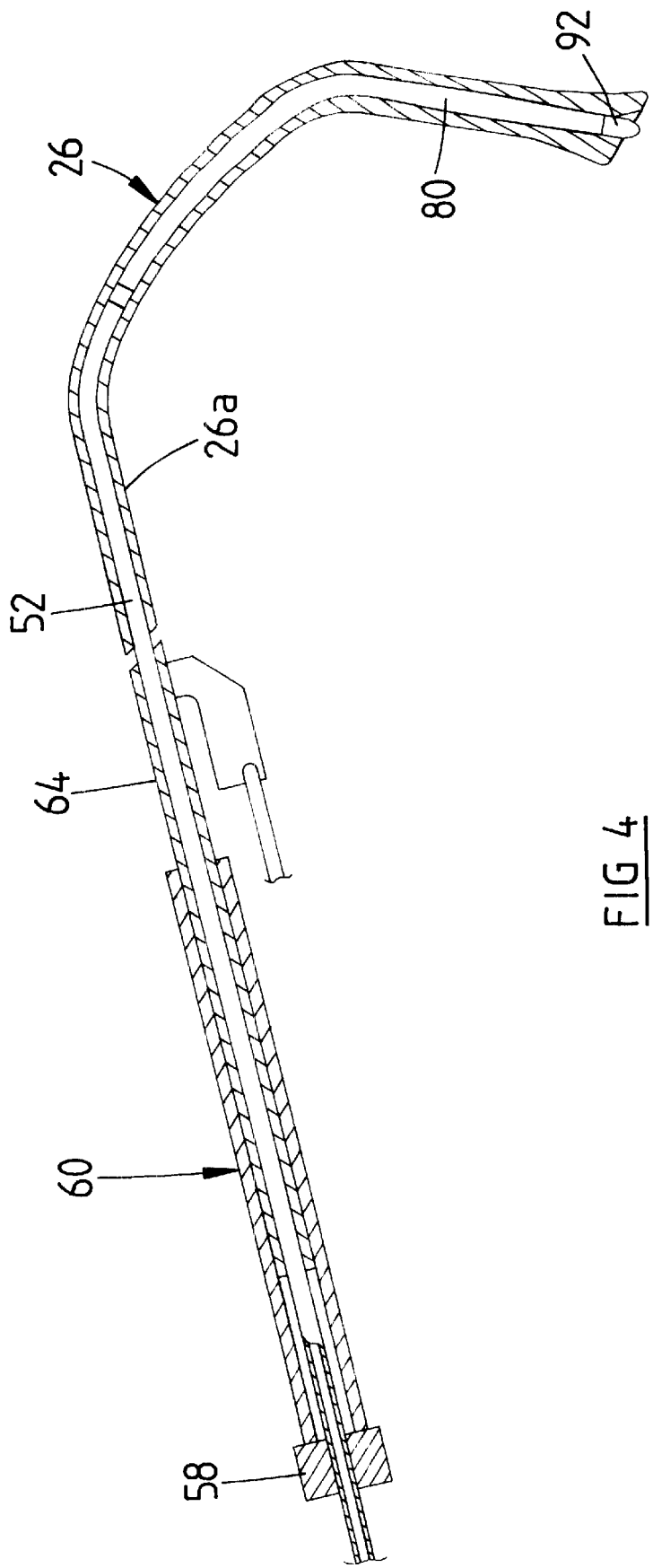
FIG. 4 is a view like FIGS. 2 and 3, but showing illustrated components in a still further condition.

After drilling has begun, and the head 92 has been advanced a short distance into pipe 26, to the position shown in FIG. 3, hydraulic ram 68 is actuated to slightly withdraw guide tube 64 into tube 62. This condition of the guide tube is illustrated in FIG. 4. By this, there is a clearance gap between the guide tube and pipe 26, which facilitates the clearance of drilled material from the pipe 26. That is, drilled material passing back through the pipe 26 may fall through this gap and be cleared from the pipe 26 and guide tube 64.

Because of the flexible nature of the rod 80, it is possible to advance the head 92 along the interior of the pipe 26 until it passes entirely therethrough, which condition is shown in FIG. 4. In this process, material cut from the internal passageway of the pipe 26 passes downwardly to be collected in a bin 98. After cutting is so-effected, the carriage 44 is moved back again to the position shown in FIGS. 1 and 2, and the motor 50 is stopped so as to complete the process. The pipe 26 may then be removed by releasing the clamping by the hydraulic rams 28, 30 and 35 and, for example, manually removing the pipe from the platform 18. At completion, also, the guide tube 64 is moved back to the position shown in FIGS. 1 and 2.

Control of the movements of the various components as shown in FIG. 1 may be effected more-or-less automatically.

For example, the motor 48 may be controlled so that the drill rod feed speed is controlled in two modes—high cutting speed for straight sections and low cutting speed for the transition as the cutter head passes through bends. The feed speed may also be controlled via a torque feedback loop from the drill rotation drive motor 50, such that when the torque increases above a certain preset limit the feed speed is reduced accordingly. Thus, if the torque reaches a critical limit the feed mechanism retracts the drill rod a preset distance and then advances forward again slowly. The control parameters may be set so that the apparatus will retry in this way three times before retracting the drill rod completely. This is usually only necessary if the tapping pipe is blocked with aluminium.

The drill rod feed mechanism may incorporate an LVDT (linear variable differential transformer) which detects the position of the drill rod drive assembly, and therefore the movement of the drill rod 80. If it detects that the drill rod 80 and cutter head 92 are not advancing it initiates the same procedure as outlined above for critical torque When the cutter head has reached the far end of the tapping pipe, which is sensed by the LVDT on the feed mechanism, it is withdrawn until it is completely retracted. As the drill rod 80 is withdrawn compressed air is blown onto it, in the gap between the guide tube and the tapping pipe, to remove any debris which is adhered to the flexible joints in the drill rod 80. Any carry-over of debris that the air jets fail to remove is collected in a chamber below the rear of the guide tube from where it can be evacuated manually.

When the flexible drill rod is completely retracted both the guide tube and the clamps may be automatically retracted. Possible control regimes are described below.

Figure 7:
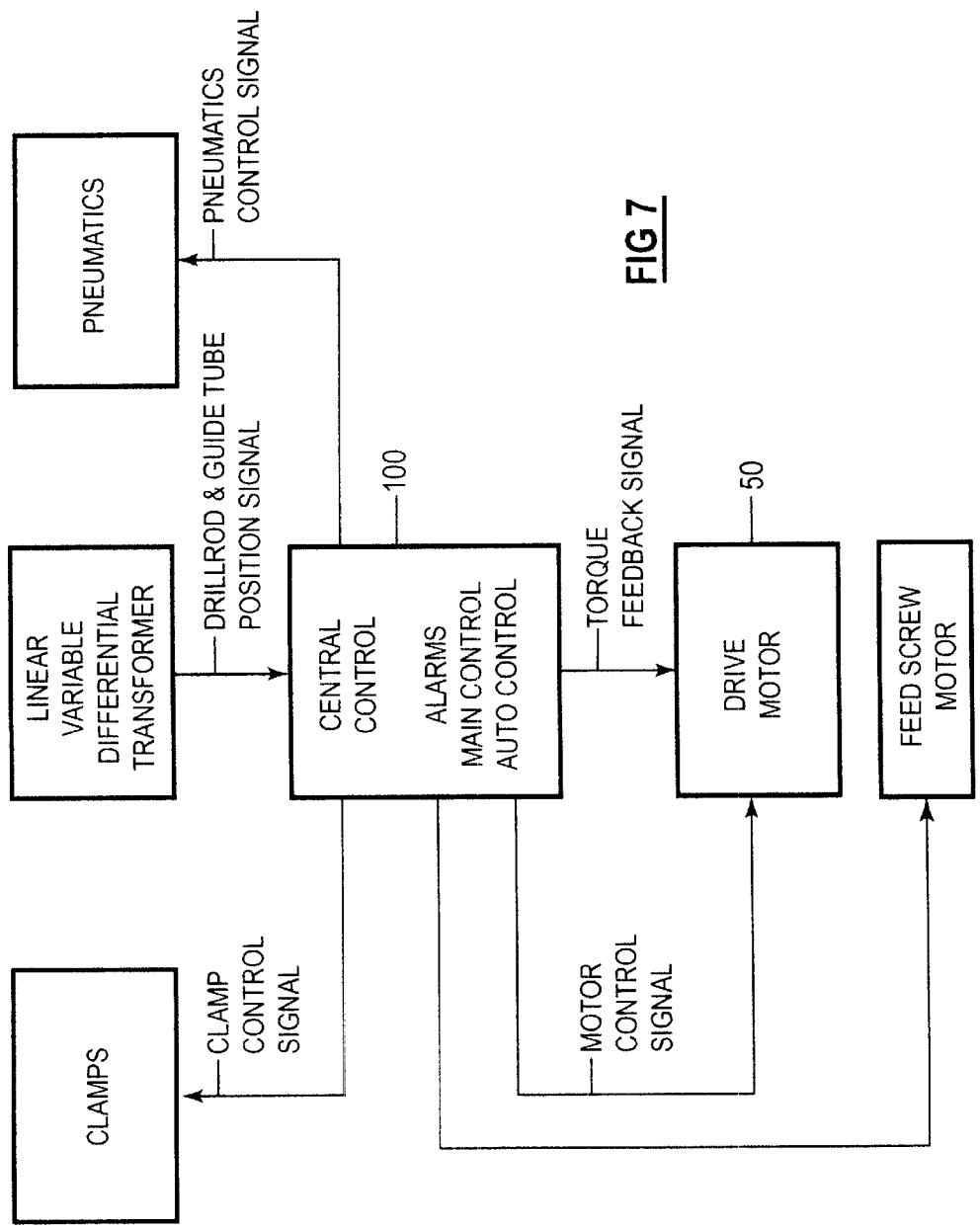
FIG. 7 is a diagram illustrating the manner in which control of the apparatus of FIG. 1 is effected.

FIG. 7 shows some aspects which may be so automatically controlled under the control of central control 100. This control 100 provides signals to the drive motor 50, such as to control its speed of operation, to pneumatics for controlling the air flow aforementioned, and to control the clamping operation of the hydraulic rams 28, 30. Control of the motor is facilitated by connecting the motor in the torque feedback arrangement mentioned. The feed screw motor 48 is also controlled from central control 100.

Figure 8:
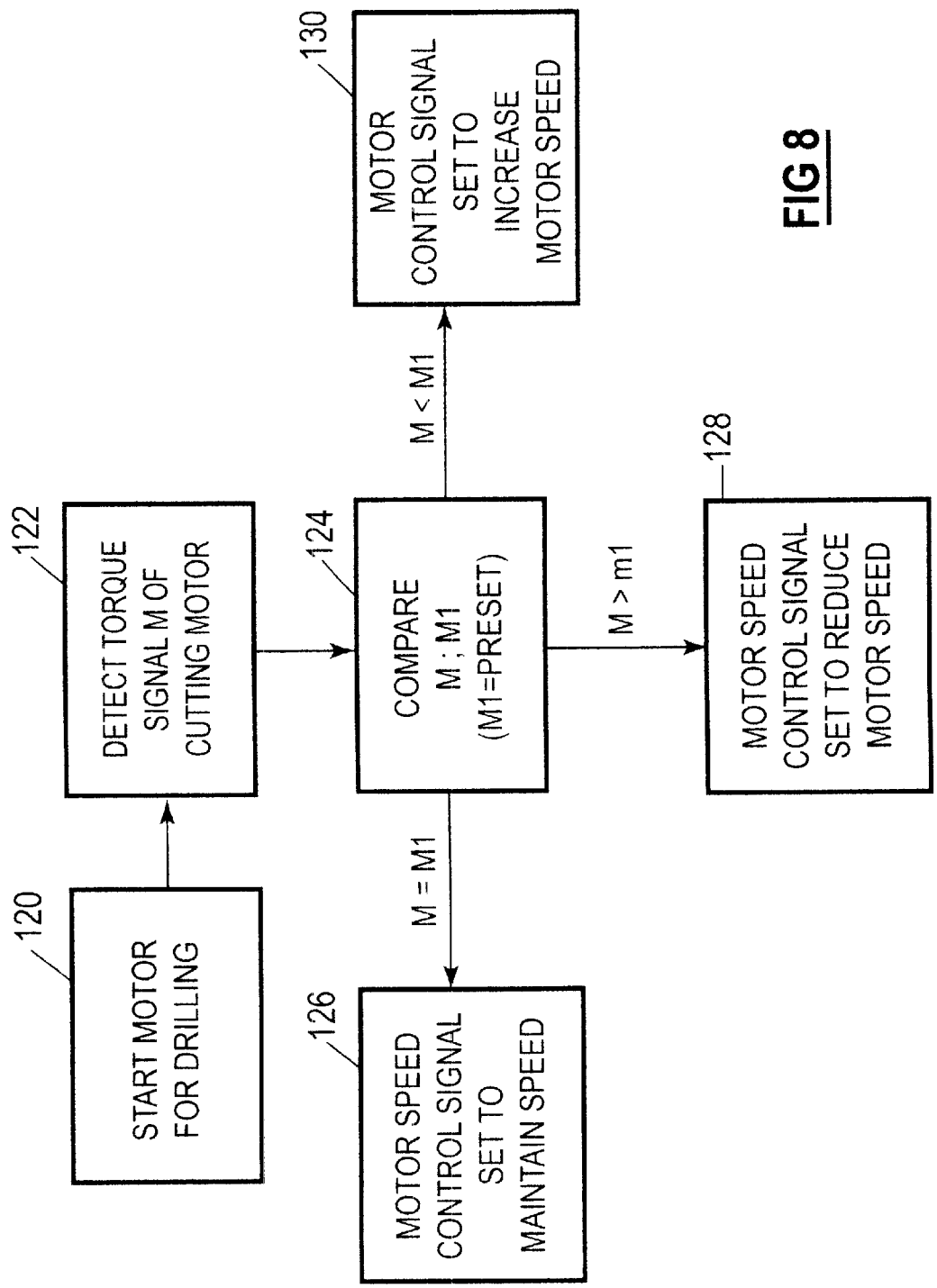
FIG. 8 is a flow diagram illustrating control functions for regulation of motor drive speed in the apparatus of FIG. 1.

FIG. 8 shows some aspects of control of motor speed during an operation. After initiating operation, at step 120 shown, steps 122, 124 are repetitively executed. At step 122 the torque feedback signal from the drive motor 50 is detected. At step 124 the magnitude M of the feedback signal, which is indicative of the magnitude of the applied torque from the motor 50, is compared with a preset value M1 representing the maximum torque to be applied during operation. In the case that this comparison indicates that the signals are the same, the motor speed control signal is set to maintain motor speed, at the step 126 shown. In the case that the magnitude M exceeds M1, motor speed control signal is set to reduce motor speed, at step 128. In the case where the signal is less than M1, the motor control signal is set to increase motor speed at the step 130 shown. In this way, the motor speed may be controlled to maintain efficient cutting. Although not shown in FIG. 8, it is possible to vary the preset M1 at different stages of the operation, such that, for example, a higher cutting speed is applied at straight sections of the pipe 26 and a lower speed is applied as the cutter is passed through bends in the pipe 26. Thus, the preset value M1 may be changed at predetermined points in the cleaning cycle to accomplish this.

Figure 9:
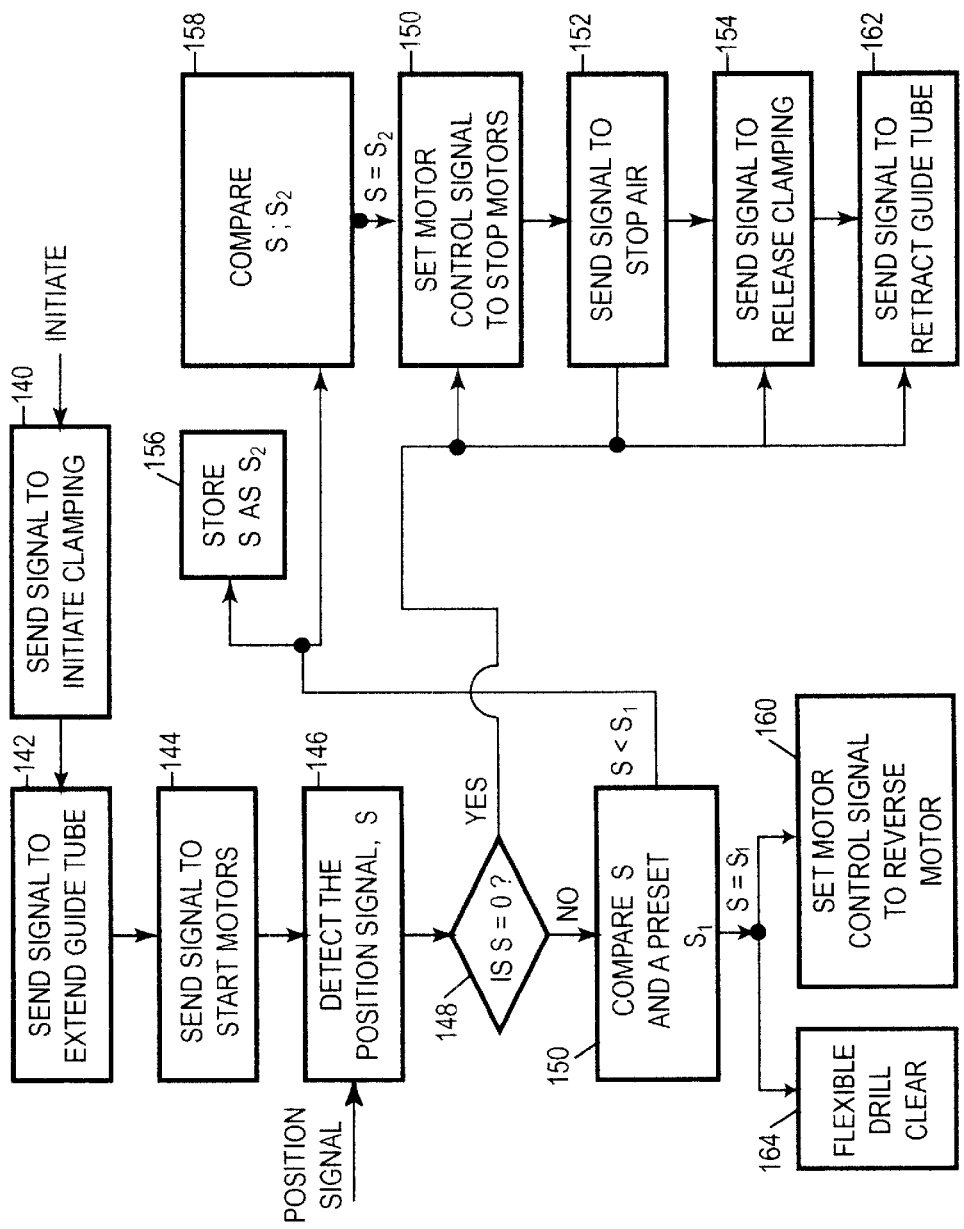
FIG. 9 is a flow diagram of control functions implemented during a cycle of operation of the apparatus of FIG. 1.

It is also desirable to control the operation with reference to the movement of the flexible drilling rod 80 through the pipe 26. FIG. 9 illustrates one method of effecting this, as well as control functions with reference to clamping and operation of the air blast as described. Here, on initiation of operation, and at step 140 as shown, a signal is sent to actuate the hydraulic rams 28 and 30 to initiate clamping, and a signal is sent at step 142 to start operation of the motor 50. Then signal is sent to actuate the hydraulic ram 68 to extend the guide tube 64 to engage the pipe 26, at step 142. At step 144, signal is sent to start the motors 48, 50. At step 146, repetitive detection of a position signal S representing the position of the carriage 44, and thus of the flexible drill rod 80, is detected. That signal may, for example, be generated by a linear variable differential transformer. At step 148, repetitive determinations are made as to whether the signal S is indicative that the carriage 44 is at its rest position (ie at the end of a cycle operation). If so, the operation is completed by stopping the motors 48, 50 (step 150) stopping air blast (step 152) releasing the clamping (step 154) and retracting the guide tube 64 (step 162). If the signal is not indicative of the carriage being at the rest position, repetitive comparisons are made as between the signal S, and a preset value S1, where S1 represents the extreme forward position of the carriage 44 and flexible drill rod 80. If this comparison indicates that the signal S is less than a preset value S1, representing full travel of carriage 44, the signal S is stored as a stored value S2, at step 156. Then, repetitive comparisons are made (step 158) as to whether the stored value S2 is the same as, or substantially the same as the current value S. If so, motors 48, 50 are stopped at step 150, this corresponding to a case where no movement of the carriage and cutter head 92 is occurring. Although not illustrated, an automatic sequence may then be executed to attempt several times to re-initiate drilling, with the drilling only being finally ceased after, say, three unsuccessful attempts, as mentioned earlier. In the event that the comparison indicates that position signal S has reached the preset signal S1, that is that the flexible drill rod 80 has reached its fully extended position, motor control signal is set at step 160 to reverse the motor 48 so as to retract the carriage 44 to its rest position so pulling the flexible drill rod 80 from the pipe 26 and retracting it back into the assembly 60. A cleaning operation (step 164) may likewise be effected.

Of course, more complex regimes man above-described may be utilised. As mentioned, it has been found advantageous, for example, to slightly retract the guide tube 64 from the pipe 26 after commencement of drilling, in order to provide a clearance space for the ejection of material cut by the cutting head. In that case, a comparison may be made of the signal S as mentioned with a farther preset S3 to send a signal to effect operation of the cylinder 68 for so moving the guide tube 64 when that comparison shows that the cutting head has moved a desired predetermined distance into the pipe 26, so as to effect slight reverse movement of the guide tube 64.

During retraction, compressed air may continue to be blown into the guide tube 64 so as to blow debris accumulated on the drilling rod from this for removal, as the drilling rod is retracted into guide tube. The debris may be removed at the lowermost end of the tube 64, that is the end furthest away from the unit 14, and caught in a hopper 82

Figure 10:
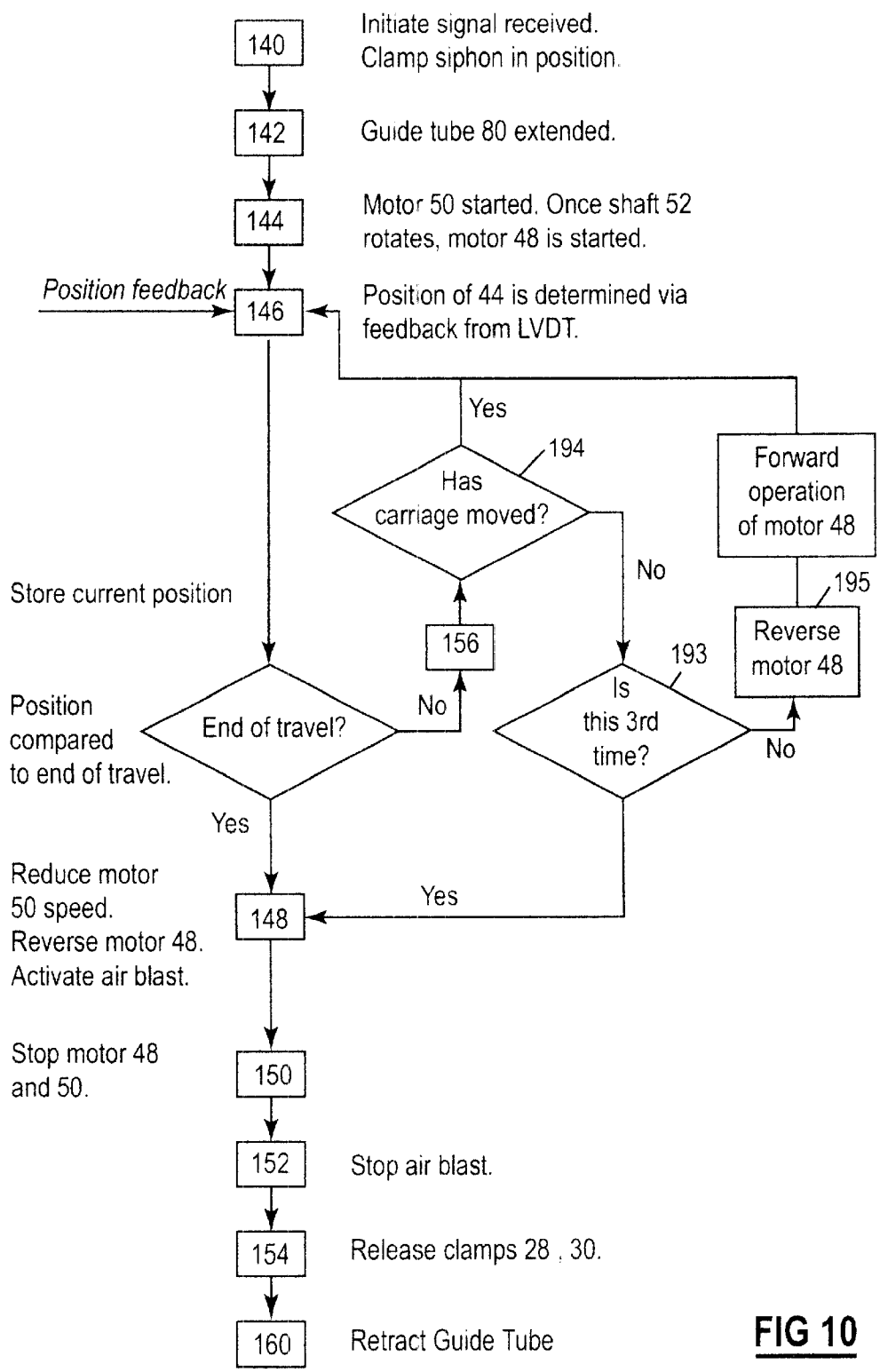
FIG. 10 is a further flow diagram illustrating control functions.

FIG. 10 summarises the steps mentioned in FIG. 9, and also indicates further respective steps 193 of determining if the end of travel of the carriage 144 has been detected. If no travel is detected on three successive detections speed of motor 50 is reduced, motor 48 is reversed and an air blast is activated (step 148). If there is no movement of motors 48, 50 (step 150) the system stops and an alarm is raised. If no carriage motion is detected on two successive detections, motor 48 is first activated in reverse and then forwardly (step 175, 179).

Figure 5:
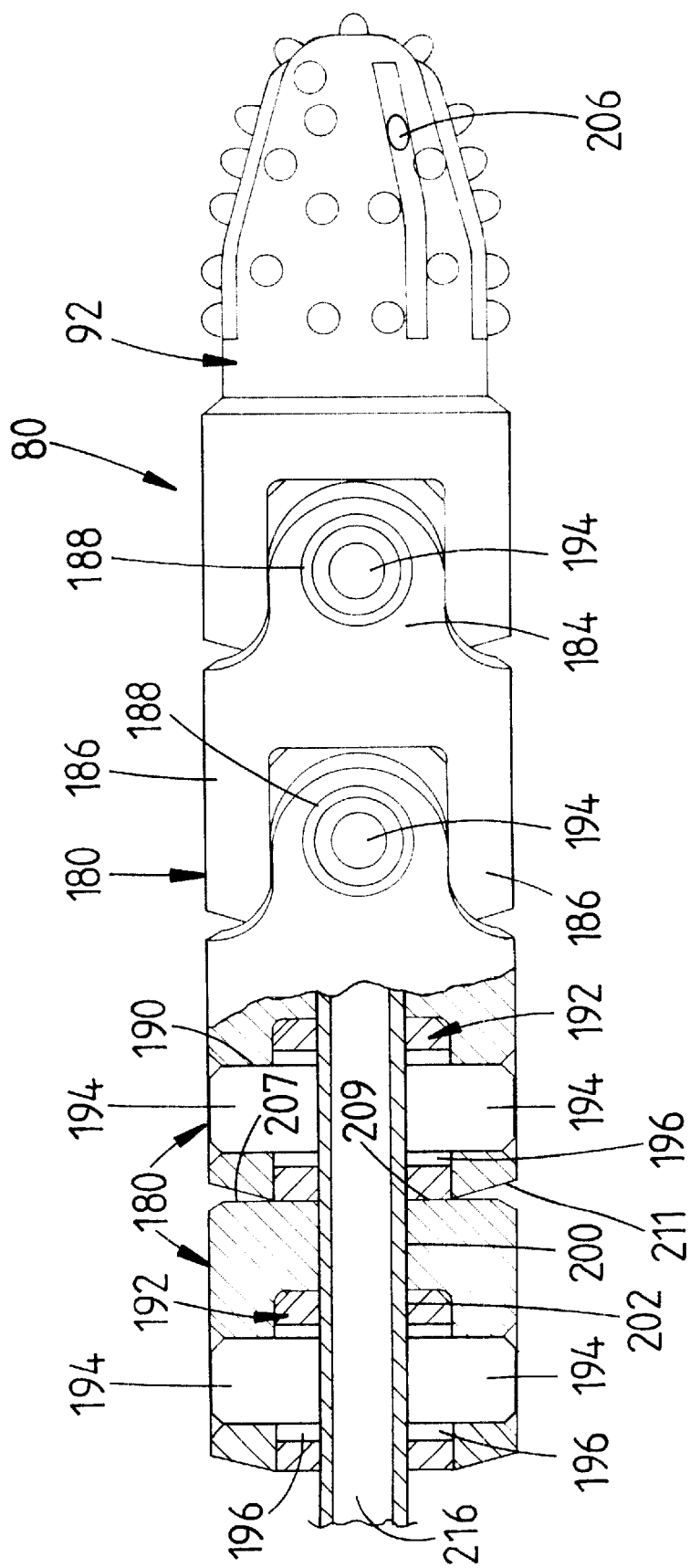
FIG. 5 is a side view of part of the flexible drill rod forming part of the apparatus of FIG. 1.
Figure 6:
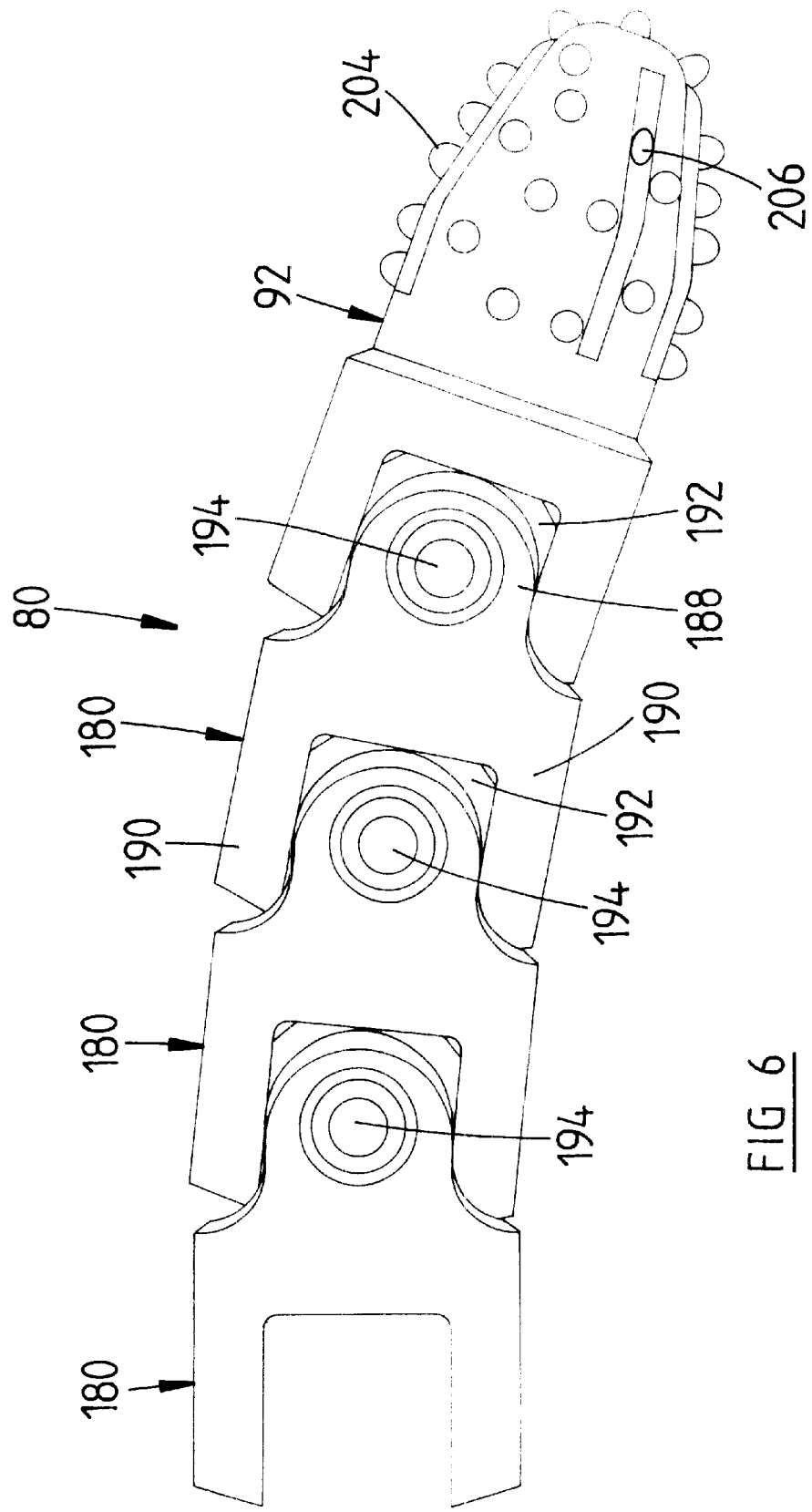
FIG. 6 is a fragmentary axial cross-section of the part of the flexible drill rod of FIG. 5.

The flexible drill rod 80 may be formed of a plurality of lengthwise spaced interconnected links 180 which define, in the axially extending condition of the drill rod, a substantially continuous cylindrical outer surface, but which nonetheless permit some degree of universal flexibility as between adjacent links. FIG. 5 shows the drill rod 80 as being formed of a plurality of such links 180. Each link has a central generally cylindrical portion 182, and first and second pairs of lugs 184, 186 extending to opposite axial sides thereof. The pair of lugs 184 extend in generally parallel relationship as do the lugs 186. Viewed axially, however, the lugs 184 are displaced with respect to the periphery of the link 180 by 90°. The pair of lugs 184 has aligned openings 188 and the pair of lugs 186 has a similarly arranged aligned openings 190. A common transverse axis of the openings 190, which passes through the longitudinal axis of the link 180 is arranged, accordingly, at 90° to a common transverse axis of the openings 188, which axis likewise extends through the lengthwise axis of the link 180. The links 180 are arranged so that lugs 184 extend in one axial directional sense and lugs 186 in the opposite directional sense, with respect to the lengthwise axis of the rod 80, with the transverse axes of the openings 190 in one link 180 being at the same lengthwise location along the length of the rod as the transverse axis of the openings 188 of the adjacent link 180, and with those axes being at 90° to each other. As best shown in FIG. 6, a somewhat cubical coupling element 192 is positioned within a generally cubical space bounded by each pair of lugs 184 of one link 180 and the lugs 186 of the adjacent such link. Coupling elements 192 have openings 196 in four peripheral faces, and locking pins 194 extend through the openings 188, 190 of the adjacent lugs so as to pass into openings 196 so as to pivotally connect lugs 184, 186 with the coupling elements 192. By this means, universal movement as between the adjacent pairs of links 180 is possible, about the transverse axes as mentioned. The pins 194 may be secured to the lugs 184, 186, such as by welding.

Figure 11:
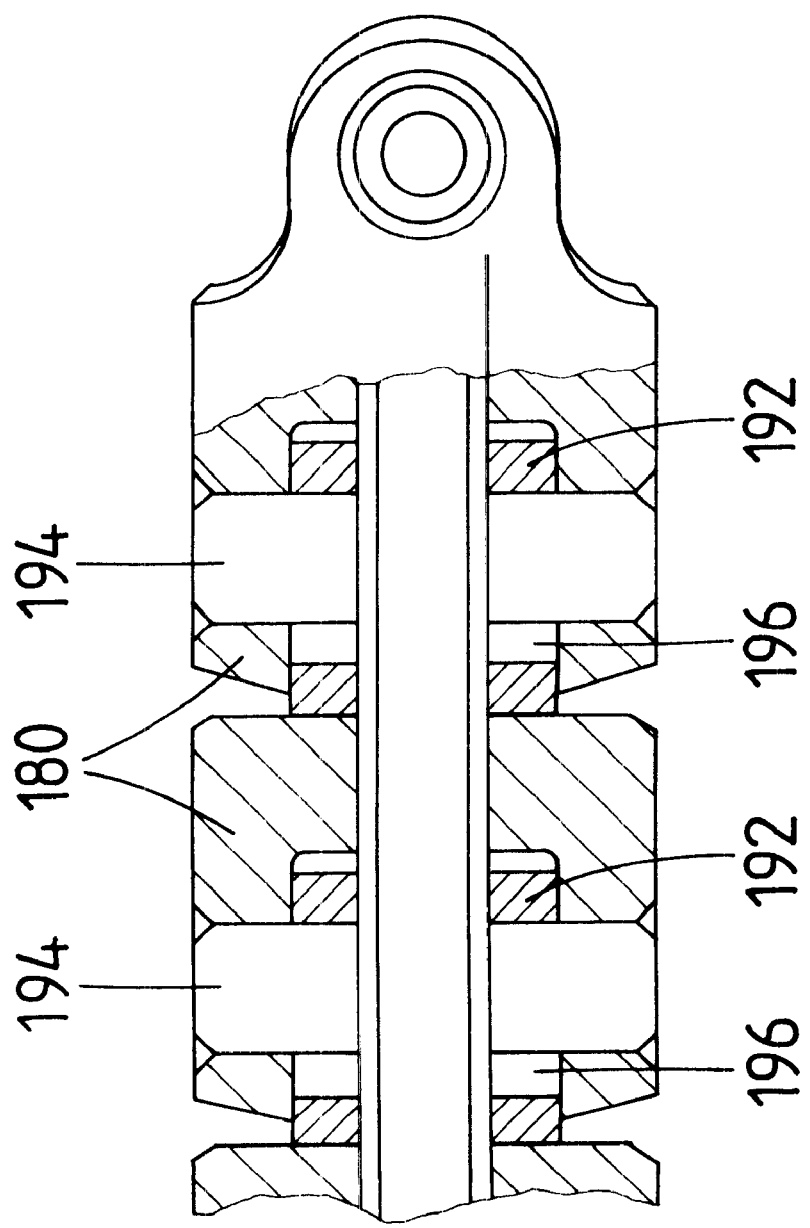
FIG. 11 is scrap view corresponding to part of FIG. 5, but showing the flexible drill rod in a different condition.
Figure 12:
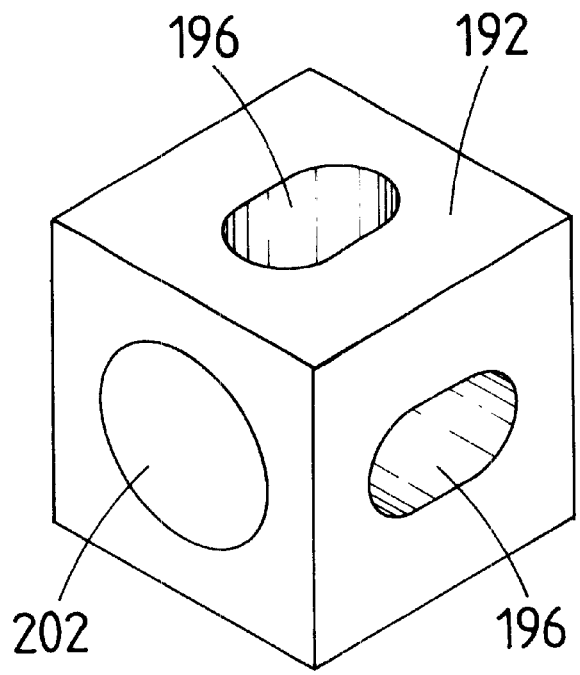
FIGS. 12 and 13 are perspective views of two different coupling elements useful in the flexible drill rod 80.

As shown in FIGS. 5 and 12, the openings 196 in each coupling element 192 are elongate in the axial direction of the flexible drill rod 80, so that relative movement between the links 180 and the coupling elements, and thus between adjacent links 180 is possible, with the pins 194 being variably positionable within the openings 196. In the condition shown in FIG. 5, the pins are displaced relatively rearwardly in the openings 196. FIG. 11 shows a condition where the links 180 are moved apart in the axial direction of the flexible drill rod until the pins 194 approach forward ends of openings 196. By this arrangement when axial compressive force is applied to the flexible drill rod it assumes the condition shown in FIG. 5, but is otherwise free to assume the condition shown in FIG. 11. In the compressed condition rear transverse surfaces 209 of the links 180 are firmly pressed against forward transverse surfaces 207 of the following links 180. Surfaces 207 are between the keys 184 of the links. In this compressed condition, the links are substantially locked as a rigid unit so that the flexible drill rod 80 is rendered to a rigid linear configuration. When, however, the links are in the extended condition of FIG. 11, the flexible drill rod is capable of bending via its universal joints, as provided by the coupling elements 192 and interconnecting pins 194. That is, the links are capable of universal movement with respect to each other. The degree of permitted movement is, however, limited by bringing together of incline end surfaces 211 of the links 180 with the adjacent surfaces 207, at limit bending positions of adjacent links 180.

As shown in FIG. 5, the links 180 and coupling elements 192 have respective openings 200, 202 therethrough, and these are axially aligned so as to provide an inner axial passageway extending opening through the rod 80 and which may receive a flexible compressed air conduit 216 for directing compressed air to the head 92 as previously mentioned. This air conduit may communicate with another conduit in an aligned passageway in shaft 52 which extends back to a location adjacent bearing 56 on carriage 48. The bearing may include a rotary coupling for admission of air into the conduit 216.

The head 92 may be of the form as shown, having a somewhat conical configuration with cutting teeth 204 thereon. The head may have openings 206 through which air delivered from the drill rod 80 exits.

The drill rod 80 may be connected to shaft 52 in any convenient way, such as by mating screw threads 219,221 (FIG. 11).

The flexible drill rod 80 may be of various different styles depending on the profile of the tapping pipe. It is generally desirable to form the drill rod as a series of flexible joints with holes drilled axially through each of the components known as universals and journals, as above described. Through these holes a conduit is, as described, passed from one end of the flexible drill rod to the other for the purpose of conveying compressed air to the cutter head.

Figure 14:
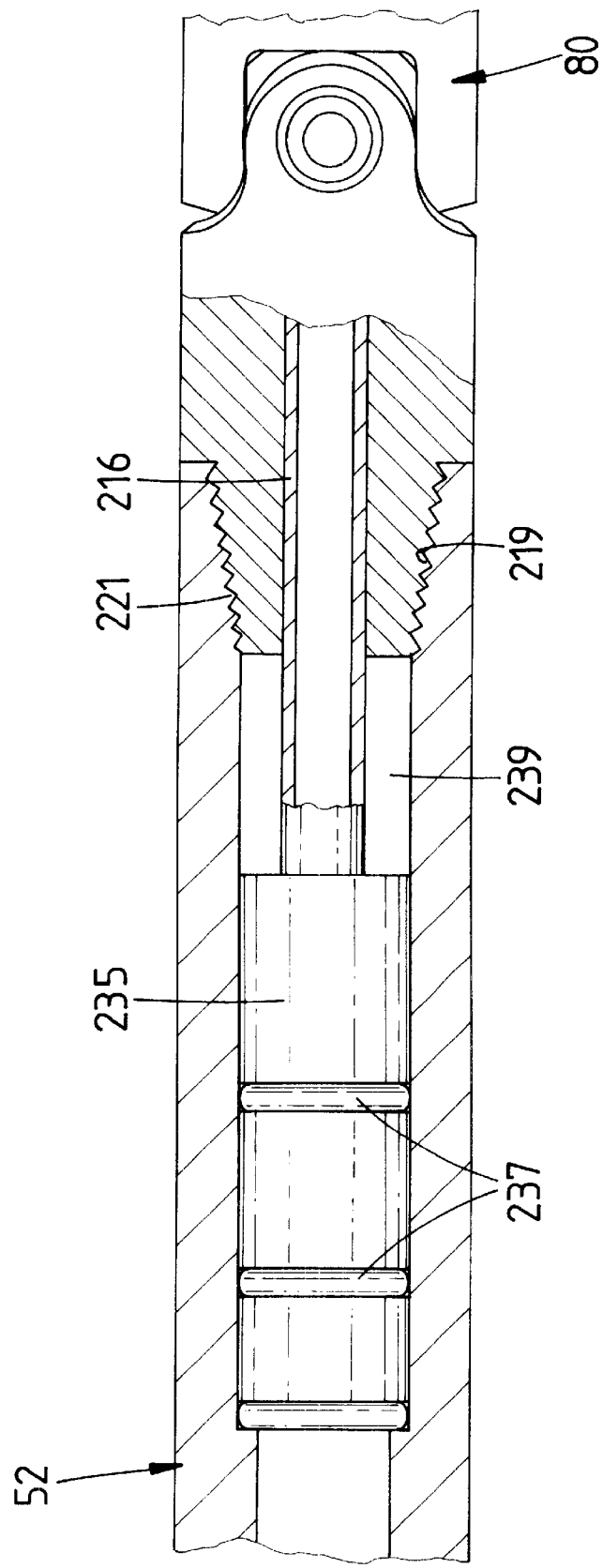
FIG. 14 is scrap partly sectional view off the region "A" marked in FIG. 2.

It will be appreciated that, since the flexible rod 80 is variable in length, the end of the conduit 216 should not be fixed with respect to shaft 52. As shown in FIG. 14, the end of the conduit 216 which is enclosed within the end of the shaft 52 may be attached to a fitting 235 which incorporates an externally sealing O-ring seal 237. The fitting 235, which acts as a piston, is free to move backwards and forwards within a chamber machined 239 into the end of the straight drill rod. This ensures that the opposite end of the conduit remains engaged with the cutter head.

Figure 13:
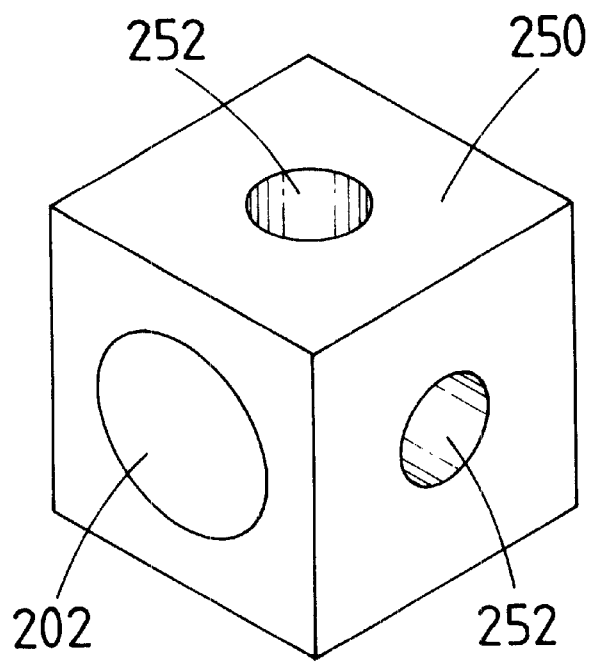

The described forming of coupling elements 192 of the flexible drill rod with elongate openings 196 to receive the pins 194 allows it to better bend where required and act as a solid drill rod if pushed together in a straight configuration. This may be used for tapping pipes 26 which have two straight lengths with an angular bend between. However, FIG. 13 shows an alternative coupling element 250 having round openings 252 instead of the elongate openings 196. In this case, movement of the links 180 and coupling elements 250 the flexible drill rod is substantially precluded, so the flexible drill rod has more limited bending capacity.

The style of flexible drill rod described in FIGS. 5 and 6 is particularly useful for tapping pipes with several bends or with a continuous or near-continuous curvature.

The universals, journals and pins may be manufactured from alloy steel and are heat-treated to achieve high strength and, in the case of the universals, good wearing characteristics.

Of course, the apparatus 10 may be varied to accommodate particular forms of pipe 26. For example, the bed 42 need not necessarily by inclined.

The described arrangement has been advanced merely by way of explanation any many modifications may be made thereto without departing from the spirit and scope of the invention which includes every novel feature and combination of novel features herein disclosed.

What is claimed is:

1. A drill rod for clearing obstructing material from the interior of a tapping pipe used for evacuation of aluminium from a reduction cell of an aluminium smelter by drilling, wherein the drill rod is flexible and is comprised of a plurality of links interconnected for rotation about a longitudinal axis of the rod with coupling means interconnecting each adjacent pair of links for permitting substantially universal movement of said links with respect to each other transversely relative to said longitudinal axis, the coupling means permitting relative displacement between adjacent links whereby an axial length of the connected links can be varied between a relatively compressed length and a relatively uncompressed length, said coupling means, when the connected links have a relatively compressed length, at least relatively limiting the universal movement permitted between adjacent links.

2. A drill rod as set forth in claim 1 wherein the drill rod has a hollow central passage for gas extending therethrough.

3. A drill rod as set forth in claim 2 wherein the drill rod has at one end thereof a cutting head for effecting said drilling and the cutting head has an aperture in communication with said hollow central passage for the discharge of said gas.

4. An apparatus for drilling obstructing material from within a tapping pipe of a reduction cell of an aluminium smelter comprising means for mounting the pipe in a substantially fixed condition, a drilling rod having a cutting head, means for rotating the drilling rod for rotating said cutting head and means for axially advancing the drilling rod to cause the cutting head and drilling rod to pass into the tapping pipe for effecting said drilling, wherein the drilling rod is flexible and is comprised of a plurality of links interconnected for rotation about a longitudinal axis of the rod with coupling means interconnecting each adjacent pair of links for permitting substantially universal movement of said links with respect to each other transversely relative to said longitudinal axis, the coupling means permitting relative displacement between adjacent links whereby an axial length of the connected links can be varied between a relatively compressed length and a relatively uncompressed length, said coupling means, when the connected links have a relatively compressed length, at least relatively limiting the universal movement permitted between adjacent links.

5. Apparatus as set forth in claim 1 wherein the drilling rod is hollow and means are provided for passing pressurized gas through the drilling rod to exit at a location adjacent the cutting head for facilitating drilling.

6. Apparatus as set forth in claim 5 wherein the cutting head has an aperture for said exit of pressurized gas.

* * * * *